United States Patent
Lauder

(10) Patent No.: US 9,909,730 B2
(45) Date of Patent: *Mar. 6, 2018

(54) PROCESSOR-CONTROLLED LIGHT-ADMITTING HELIOSTAT

(71) Applicant: Gary M. Lauder, Atherton, CA (US)

(72) Inventor: Gary M. Lauder, Atherton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/042,962

(22) Filed: Feb. 12, 2016

(65) Prior Publication Data

US 2016/0209634 A1    Jul. 21, 2016

Related U.S. Application Data

(63) Continuation-in-part of application No. 12/891,489, filed on Sep. 27, 2010, now Pat. No. 9,291,371.

(51) Int. Cl.
  *F21S 11/00* (2006.01)
  *F24J 2/54* (2006.01)
  (Continued)

(52) U.S. Cl.
  CPC ............ *F21S 11/005* (2013.01); *F21S 11/00* (2013.01); *F21S 11/002* (2013.01);
  (Continued)

(58) Field of Classification Search
  CPC  F24J 2/5417; F24J 2/542; F24J 2/5424; F24J 2/38; Y02E 10/47; F21S 11/00; F21S 11/002; F21S 11/005; F21S 11/007
  See application file for complete search history.

(56) References Cited

U.S. PATENT DOCUMENTS

| 1,951,404 A | * | 3/1934 | Goddard | F24J 2/10 |
| | | | | 126/581 |
| 3,709,583 A | * | 1/1973 | Pfannkuch | F21S 11/00 |
| | | | | 359/513 |

(Continued)

FOREIGN PATENT DOCUMENTS

WO    WO-1986001611    3/1986

OTHER PUBLICATIONS

Carbonari et al. A Dynamic Skylight for Daylighting and Assisting Climatisation in a Medium Size Room. PLEA2006—The 23rd Conference on Passive and Low Energy Architecture, Geneva Switzerland, Sep. 6-8, 2006.

(Continued)

*Primary Examiner* — Bao-Luan Le
(74) *Attorney, Agent, or Firm* — Van Pelt, Yi & James LLP

(57) ABSTRACT

A heliostat optimized to be positioned near a skylight or other aperture is disclosed. The heliostat comprises a plurality of reflective elements arranged in a substantially planar array, each element being mounted so as to be rotatable about a longitudinal axis of rotation. A first motor rotates the array about an axis substantially perpendicular to the plane of the array; and a second motor rotates the reflective elements about their respective axes of rotation. A processor provides control signals to operate the first motor as required to orient the array such that the respective axes of rotation of the reflective elements are substantially perpendicular to an azimuth to the sun and to operate the second motor as required to rotate the reflective elements about their respective axes of rotation to position the reflective element to reflect the sun's light to a target area.

23 Claims, 12 Drawing Sheets

(51) Int. Cl.
- *G02B 19/00* (2006.01)
- *F24J 2/38* (2014.01)
- *G02B 26/08* (2006.01)
- *G06F 9/445* (2018.01)
- *F24J 2/16* (2006.01)

(52) U.S. Cl.
CPC .............. *F21S 11/007* (2013.01); *F24J 2/16* (2013.01); *F24J 2/38* (2013.01); *F24J 2/542* (2013.01); *G02B 19/0019* (2013.01); *G02B 19/0042* (2013.01); *G02B 26/0816* (2013.01); *G06F 8/61* (2013.01); *Y02B 10/20* (2013.01); *Y02E 10/47* (2013.01)

(56) References Cited

U.S. PATENT DOCUMENTS

| | | | | |
|---|---|---|---|---|
| 3,884,217 | A * | 5/1975 | Wartes | F24J 2/07 126/571 |
| 4,023,555 | A * | 5/1977 | Bailey | F24J 2/16 126/601 |
| 4,109,638 | A * | 8/1978 | Matlock | F24J 2/14 126/573 |
| 4,114,186 | A | 9/1978 | Dominguez | |
| 4,148,301 | A * | 4/1979 | Cluff | F24J 2/1047 126/568 |
| 4,171,876 | A * | 10/1979 | Wood | F24J 2/12 126/570 |
| 4,209,231 | A * | 6/1980 | Sayre | F24J 2/16 359/853 |
| 4,256,088 | A * | 3/1981 | Vindum | F24J 2/10 126/571 |
| 4,349,245 | A | 9/1982 | Kliman | |
| 4,429,952 | A | 2/1984 | Dominguez | |
| 4,440,150 | A * | 4/1984 | Kaehler | F24J 2/38 126/574 |
| 4,509,825 | A | 4/1985 | Otto | |
| 4,620,771 | A | 11/1986 | Dominguez | |
| 4,649,899 | A * | 3/1987 | Moore | F24J 2/38 126/572 |
| 4,716,258 | A | 12/1987 | Murtha | |
| 4,720,170 | A | 1/1988 | Learn, Jr. | |
| 4,771,764 | A * | 9/1988 | Cluff | F24J 2/08 126/577 |
| 4,820,020 | A | 4/1989 | Terrill | |
| 4,870,949 | A * | 10/1989 | Butler | F24J 2/12 126/571 |
| 4,883,340 | A * | 11/1989 | Dominguez | F21S 11/00 126/576 |
| 5,325,844 | A * | 7/1994 | Rogers | F24J 2/10 126/600 |
| 5,493,824 | A * | 2/1996 | Webster | E04D 13/033 250/203.4 |
| 5,517,358 | A | 5/1996 | Dominguez | |
| 5,729,387 | A | 3/1998 | Takahashi | |
| 6,025,583 | A | 2/2000 | Whitehead | |
| 6,407,832 | B1 | 6/2002 | Holzbach | |
| 7,192,146 | B2 * | 3/2007 | Gross | F24J 2/38 359/853 |
| 7,660,039 | B2 | 2/2010 | Santoro | |
| 8,063,349 | B2 * | 11/2011 | Huss | F24J 2/07 126/680 |
| 8,104,893 | B2 * | 1/2012 | Reznik | F24J 2/07 126/573 |
| 8,322,332 | B2 * | 12/2012 | Rogers | F24J 2/5427 126/600 |
| 2002/0075579 | A1 * | 6/2002 | Vasylyev | F24J 2/14 359/853 |
| 2005/0034752 | A1 * | 2/2005 | Gross | F24J 2/38 136/246 |
| 2008/0210293 | A1 * | 9/2008 | Reid | F24J 2/38 136/251 |
| 2009/0107485 | A1 * | 4/2009 | Reznik | F24J 2/07 126/600 |
| 2009/0199846 | A1 * | 8/2009 | Collins | F24J 2/405 126/601 |
| 2010/0175738 | A1 * | 7/2010 | Huss | F24J 2/07 136/246 |
| 2010/0206302 | A1 * | 8/2010 | Cheung | F24J 2/14 126/694 |
| 2010/0254010 | A1 | 10/2010 | Whitehead | |
| 2011/0137466 | A1 * | 6/2011 | Miller | F24J 2/38 700/275 |
| 2011/0253128 | A1 * | 10/2011 | Nakamura | F24J 2/07 126/645 |
| 2013/0032135 | A1 * | 2/2013 | Waterhouse | F24J 2/38 126/572 |

OTHER PUBLICATIONS

Christoffersen et al., An Experimental Evaluation of Daylight Systems and Lighting Control, Right Lite 4, 1997, vol. 2.

Michael Barrier, Let Your Big Light Shine—So-Luminaire Daylighting Systems Corp, Nations Business, Feb. 1995.

Nysan Solar Control. Nysan Introduces SolarWare TM Control System—Flexible, Powerful System Automates Internal Shading Devices—Calgary, Alberta, Jun. 3, 2008.

Solar Tracking Skylights: TreeHugger. Feb. 1, 2008: http://www.treehugger.com/files/2008/02/solar_tracking.php.

Stiles et al. A solar Lighting Industry Association Imperatives for the Solar Lighting Industry. Florida Atlantic University's Energy Conservation Assistance Program. Draft, Jan. 1 5, 1997 Submitted to Solar Today, American Solar Energy Society.

Tang et al. Heliostat Skylight. ECE 476 Final Project. Cornell University. Apr. 24, 2009.

* cited by examiner 2 th + phi = 90

PROCESSOR-CONTROLLED LIGHT-ADMITTING HELIOSTAT

CROSS-REFERENCE TO OTHER APPLICATIONS

This application is a continuation-in-part of co-pending U.S. patent application Ser. No. 12/891,489 entitled LIGHT-ADMITTING HELIOSTAT filed Sep. 27, 2010, which is incorporated herein by reference for all purposes.

BACKGROUND OF THE INVENTION

A heliostat typically includes one or more mirrors or other reflective surfaces the position and/or orientation of which are moved so as to keep reflecting sunlight toward a predetermined target despite the sun's apparent motions in the sky. Typically the target is stationary and the sun's light is reflected in a constant direction.

Some heliostats actively track and follow the sun, for example using light sensors. Others are controlled by a computer. The computer is given the latitude and longitude of the heliostat's position on the earth and the time and date. From these, using astronomical theory, the computer calculates the direction of the sun as seen from the mirror, e.g. its compass bearing (azimuth) and angle of elevation. Then, given the direction of the target, the computer calculates the mirror orientation required to reflect the sun's light to the target, and sends control signals to motors, such as stepper motors, so they turn the mirror to the correct alignment. This sequence is repeated to keep the mirror properly oriented.

Heliostats have been used in solar power applications, to direct the sun's light continuously onto a photovoltaic or other solar cell. They also have been used in daylighting, i.e., using reflected sunlight to illuminate interior or even exterior spaces. For example, heliostats have been used to direct reflected sunlight into interior spaces, such as into a building through a window or skylight. In such uses, typically the heliostat has been positioned outside the window or skylight and used to direct reflected sunlight, for example at a perpendicular or other constant angle, into an interior space through a window, a skylight, or a solar tube or other indirect path. Such external heliostats are exposed to the elements and may require roof penetrations to mount them. In addition, external heliostats may not be practical or desired for use with preexisting skylights or windows.

BRIEF DESCRIPTION OF THE DRAWINGS

Various embodiments of the invention are disclosed in the following detailed description and the accompanying drawings.

DETAILED DESCRIPTION

Figure 1:
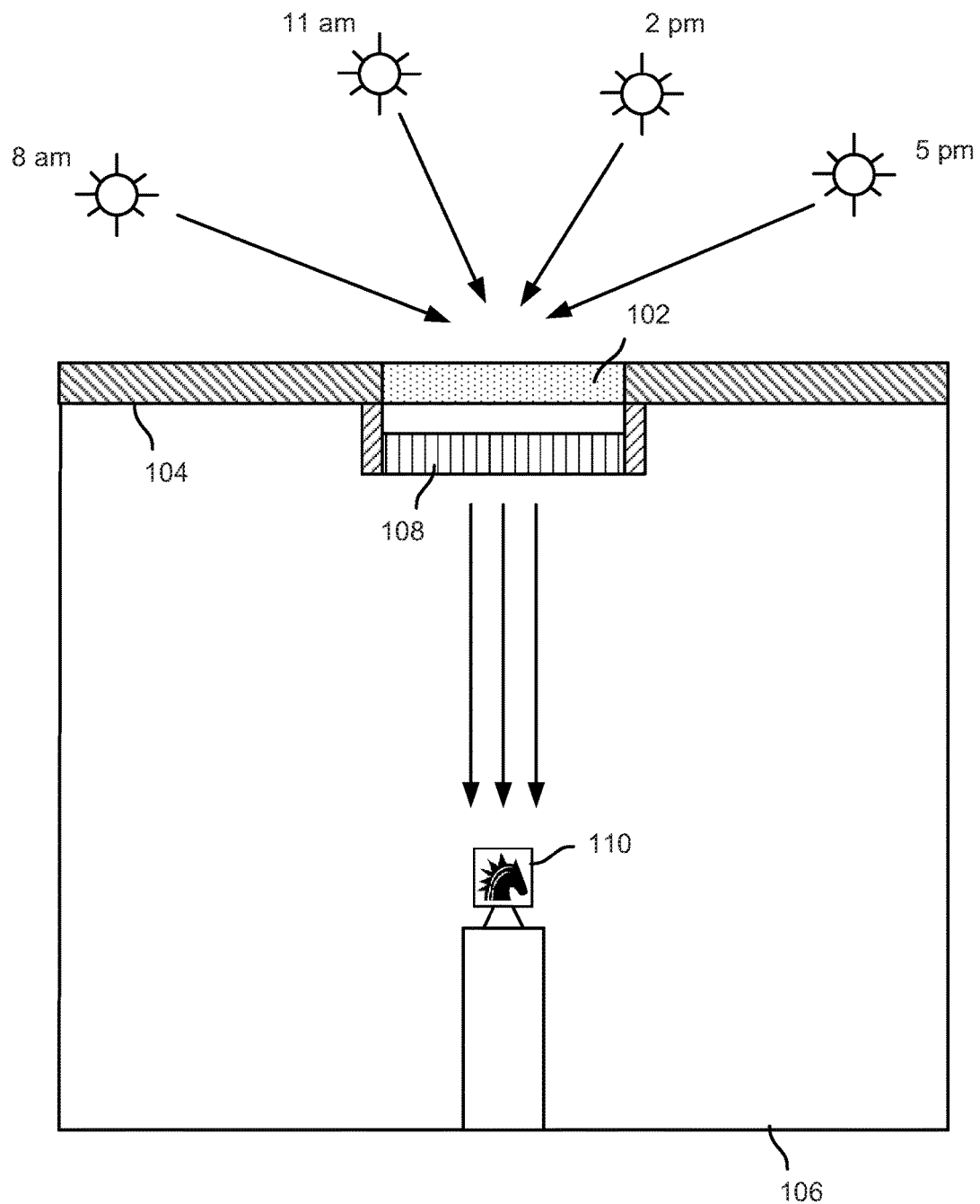
FIG. 1 is a block diagram illustrating an embodiment of a heliostat.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A heliostat suitable use for daylight or other applications is disclosed. In some embodiments, the heliostat includes a set of substantially rectangular reflectors arranged in a louver-like array. The array of reflectors is mounted in a ring or other housing, in a position such that the respective longitudinal axes of the reflectors lie substantially in one or more planes perpendicular to a central axis of the housing, such as an annular axis of a ring housing. The housing is rotatably mounted on a frame. A first stepper motor or other drive mechanism is responsive to control inputs to rotate the housing so as to orient the array so that the respective longitudinal axes of the respective array elements are perpendicular to the direction of the sun. A second stepper motor or other drive mechanism is responsive to control inputs to rotate the array elements about their respective longitudinal axes to achieve a tilt angle required to receive the sun's light through a skylight or other window, at varying angles as the apparent angle of elevation of the sun changes through the day, and reflect the received light to a stationary or other target.

FIG. 1 is a block diagram illustrating an embodiment of a heliostat. In the example shown, sunlight enters an interior space through a skylight or other window 102 positioned in an opening in a roof or other outer shell structure 104 or interior space 106. Sunlight enters the skylight 102 from varying compass directions and at varying apparent angles of elevation as the sun appears to move through the sky in the course of the day. A heliostat 108 directs reflected light of the sun to illuminate a target area 110. In some embodiments, the heliostat is computer-controlled and changes the orientation of an array of mirrors or other reflectors as the sun appears to move through the sky to reflect light in a constant direction, in this example straight down, to illuminate the target area 110. In various embodiments, the heliostat may be configured to illuminate any desired target, for example a diffuser to fill the interior space 106 with diffuse light; a user indicated target to which the reflected light of the heliostat has been pointed by a user, for example using a remote or other control device, and onto which a control system of the heliostat has locked position; a reflector or other device configured to further direct the light reflected by the heliostat to a further target; or any other target.

Figure 2A:
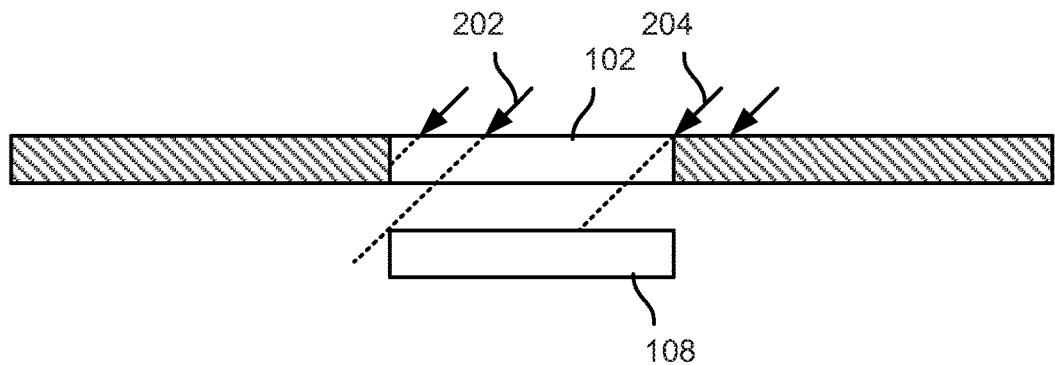
FIGS. 2A and 2B are block diagrams illustrating embodiments of a heliostat.
Figure 2B:
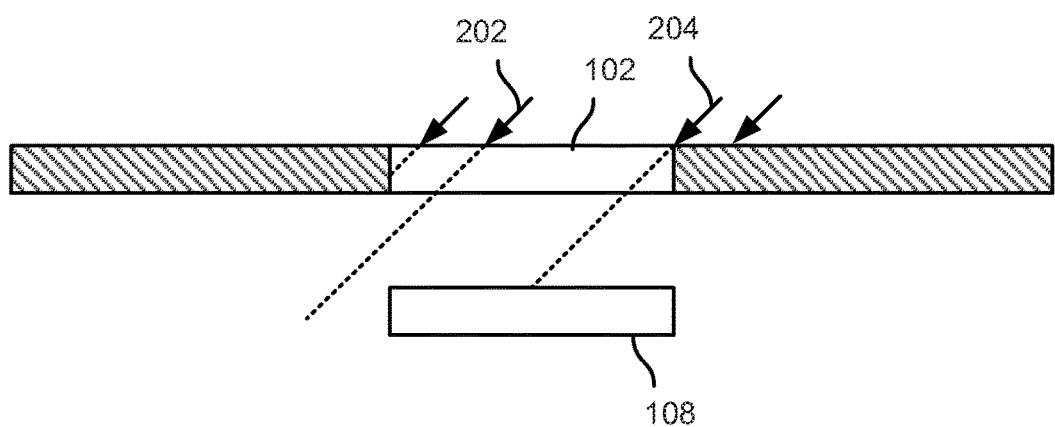

FIGS. 2A and 2B are block diagrams illustrating embodiments of a heliostat. In the example shown in FIG. 2A, the heliostat 108 is positioned relatively near to the skylight 102. As a result, the sun's light, represented in FIG. 2A by arrows 202 and 204, entering through skylight 102—even at the shallow angle shown—reaches a relatively large portion of the upper surface area of the heliostat 108. By contrast, as seen in FIG. 2B if the heliostat 108 is positioned further away from the skylight 102, in this example approximately twice the distance, light that formerly struck the heliostat in the example shown in FIG. 2A no longer does, as shown by the dotted line indicating the path of light associated with arrow 202. As a result, the sun's light reaches directly only about the left half of the upper surface of heliostat 108 in the example shown in FIG. 2B. In various embodiments, therefore, the size and/or number of mirrors or other reflective elements comprising heliostat 108 is selected at least in part to enable the heliostat 108, and in particular the mirrors or other reflectors comprising heliostat 108, to be positioned as near as possible to the skylight or other window 102, i.e., as near as possible without having the mirrors or other reflectors be prevented by contact with skylight 102 or any other structure from being moved into a position (e.g., a tilt angle) required to reflect light to the target. Doing so maximizes the total reflective surface area that can be used to reflect the sun's light to the desired target.

Figure 3:
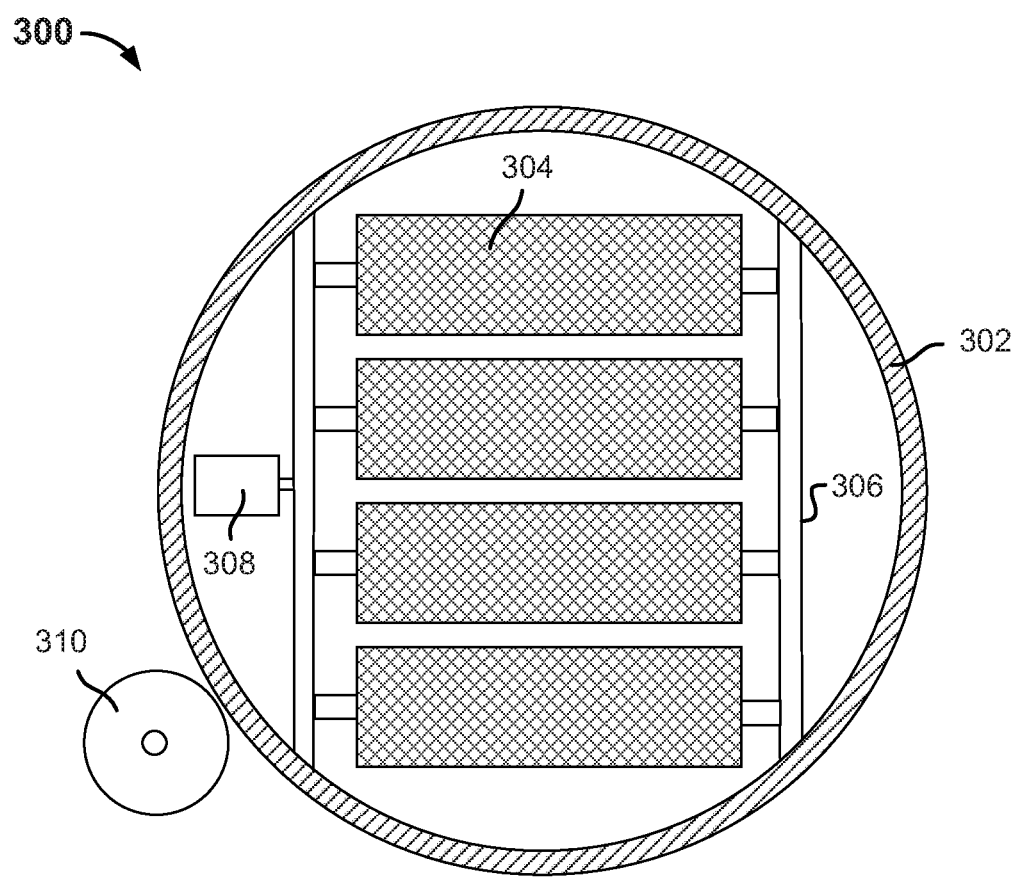
FIG. 3 is a block diagram illustrating an embodiment of a heliostat.

FIG. 3 is a block diagram illustrating an embodiment of a heliostat. In the example shown, the heliostat 300 is viewed from the top (or bottom). Heliostat 300 comprises a ring or other annular housing 302 and an array of rectangular mirrors 304. Each rectangular mirror 304 is mounted on a set of left and right brackets 306 in a manner that allows the mirrors 304 to be rotated about their respective longitudinal axes, e.g., to achieve a tilt angle required to reflect the sun's light to a target. A stepper motor or other drive mechanism 308 is responsive control signals (not shown) to position the mirrors 304 at a required tilt angle, e.g., such that a perpendicular to the reflective surface of the mirror bisects an angle formed by the sun, the reflective surface, and the target. In some embodiments, transmission elements not shown in FIG. 3, such as gears, wheels, rollers, belts, etc. are housed in and/or mounted on brackets 306 to transmit the rotational movement and force of a shaft of motor 308 to rotatable longitudinal shafts or other elements used to mount mirrors 304 to brackets 306.

In the example shown in FIG. 3, housing 302 comprises a rotatably mounted ring. A nylon or other roller 310 driven by a second stepper or other motor, not shown, rotates the housing 302 as required to maintain the array of mirrors 304 in a position such that the respective longitudinal axes of the mirrors 304 are substantially orthogonal to a compass direction to the sun. In this way, the array of mirrors 304 are rotated about the annular (vertical, in the example shown in FIG. 1 for example) axis of the housing 302 to continually face the compass direction of the sun and the mirrors are tilted to an angle, based on the altitude of the sun as it appears to move first higher then lower though the sky, such that the sun's light is reflected through the day onto the desired target.

In some embodiments, the heliostat is mounted to be as near as possible to a skylight or other aperture. In the case of a skylight or other aperture in a pitched or other non-horizontal roof, the heliostat may not be mounted horizontally and the pitch angle and direction of the skylight or other aperture, and hence the heliostat if mounted parallel thereto, are provided as inputs to the heliostat's control system, described more fully below, to enable the angular position of the array and the tilt angle of the mirrors required to maximize the amount of sunlight that is scooped and redirected to the target area, given the changing position of the sun, to be computed. In some embodiments, an accelerometer is used to sense the pitch angle at which the heliostat has been mounted.

In various embodiments, the heliostat 300 is mounted relatively very near a skylight or other window. In some embodiments, the dimension of the mirrors and other components of the heliostat are selected to allow the heliostat to be positioned as near as possible to the skylight or other window, to allow the maximum amount of sunlight possible to be scooped and redirected to the target area, even when the sun is at low angles of incidence. The close proximity to the skylight and associated heat and moisture, particularly in some climates, may make the heliostat 300 susceptible to corrosion. Therefore, in some embodiments elements of heliostat 300 are made of stainless steel or other sufficiently rigid and strong materials that will not corrode or will not corrode much even in a relatively warm, moist environment.

In various embodiments, the heliostat described herein may be used to direct to the target area light from sources other than the sun, for example at night, such as moonlight or other natural light, and/or light from a streetlamp or other artificial source.

In some embodiments, a fixed external mirror or other reflector is positioned outside the skylight or other aperture, e.g., on the north side of the aperture (in the northern hemisphere) to maximize the sunlight reflected to the target during times when the sun's angle of incidence is low.

Figure 4:
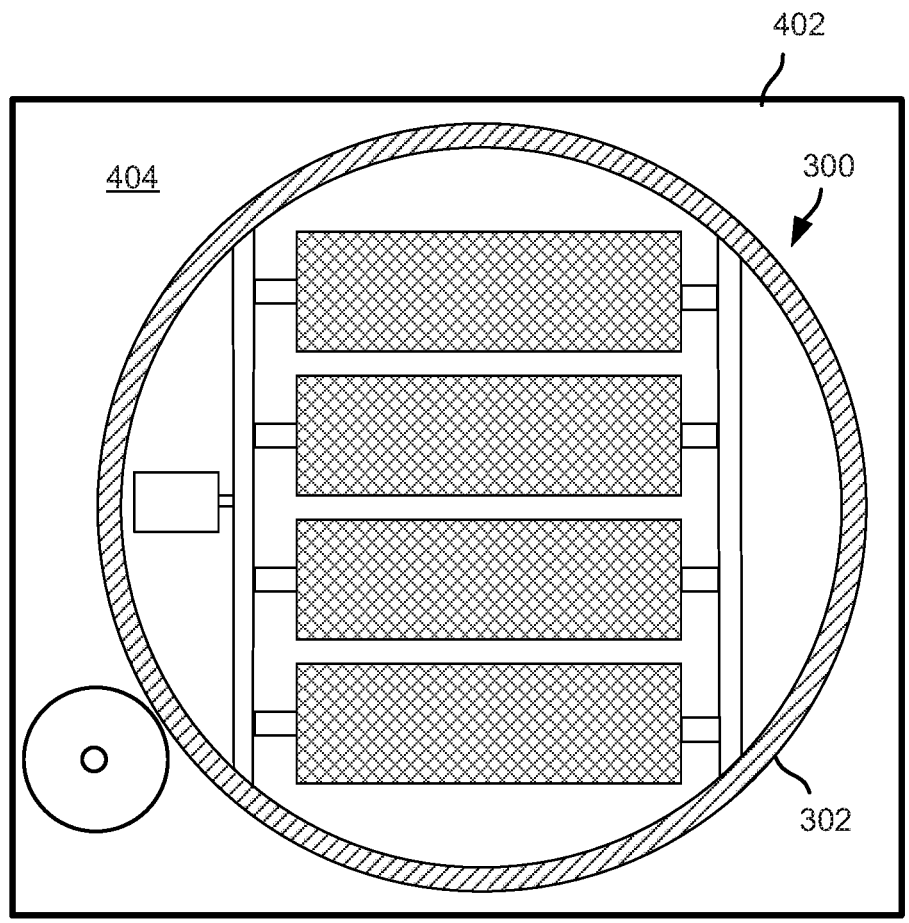
FIG. 4 is a block diagram illustrating an embodiment of a heliostat.

FIG. 4 is a block diagram illustrating an embodiment of a heliostat. In the example shown, the heliostat 300 of FIG. 3 is mounted in a frame 402. In some embodiments, mounting the heliostat in frame 402 facilitates installing the heliostat, for example by attaching frame 402 to a skylight or window frame and/or to the ceiling or other structure through which the skylight or window allows sunlight to pass. In some embodiments, to allow a maximum amount of sunlight to enter a horizontal element 404 of the frame 402, or at least a portion thereof such as the portion that lies outside housing 302, is made of Plexiglas™ or another transparent or translucent polymer, glass, or another sufficiently rigid and strong transparent or translucent material. In some embodiments, the frame 402 is larger than the skylight or other aperture, to maximize the mirror area that is exposed to intercept and redirect the sun's rays.

Figure 5:
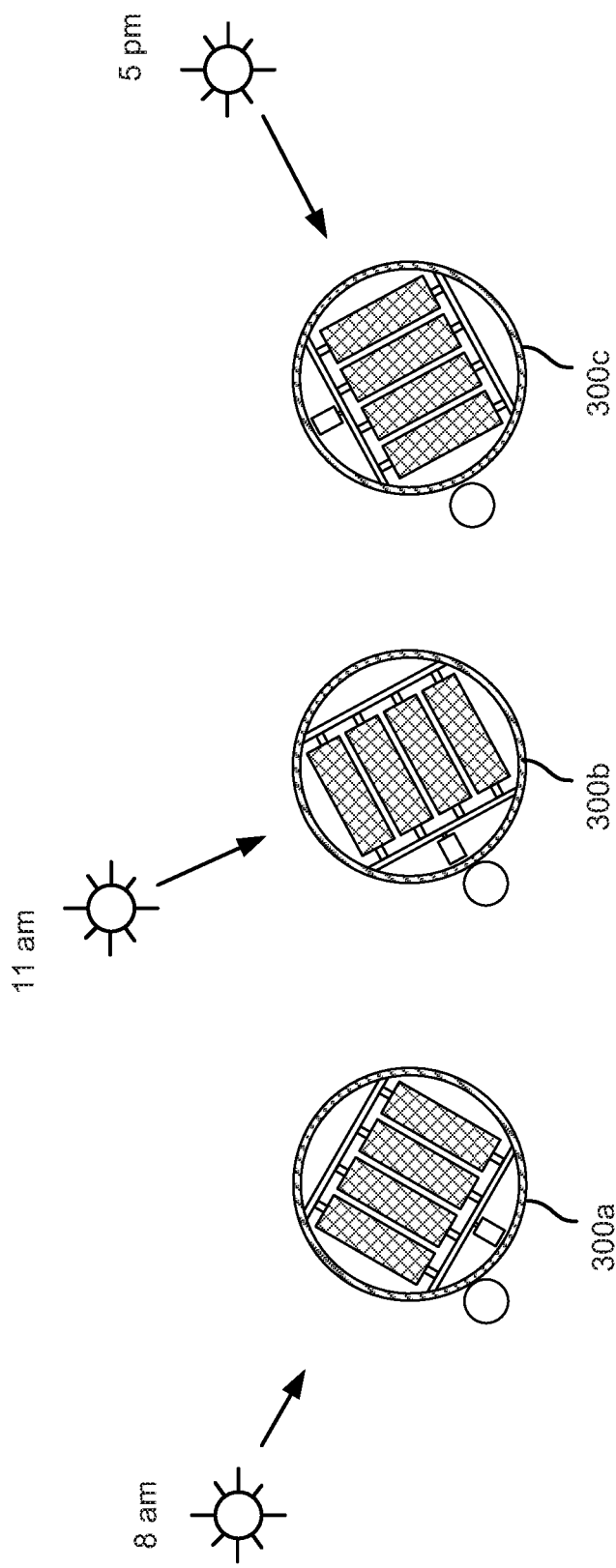
FIG. 5 is a block diagram illustrating an embodiment of a heliostat in three positions at different times of day.

FIG. 5 is a block diagram illustrating an embodiment of a heliostat in three positions at different times of day. In the example shown, heliostat 300 of FIG. 3 is shown in three positions 300a, 300b, and 300c, corresponding to times of day 8 a.m., 11 a.m., and 5 p.m. respectively. At each time of day, the heliostat 300 is shown as having been rotated to maintain a desired orientation of the array of mirrors with respect to the compass direction to the sun. This enables the sun's light to be reflected more or less continuously throughout the day onto a desired target, by tilting the reflectors to an angle such that the normal to the reflective surface bisects the angle between the sun and the target.

Figure 6:
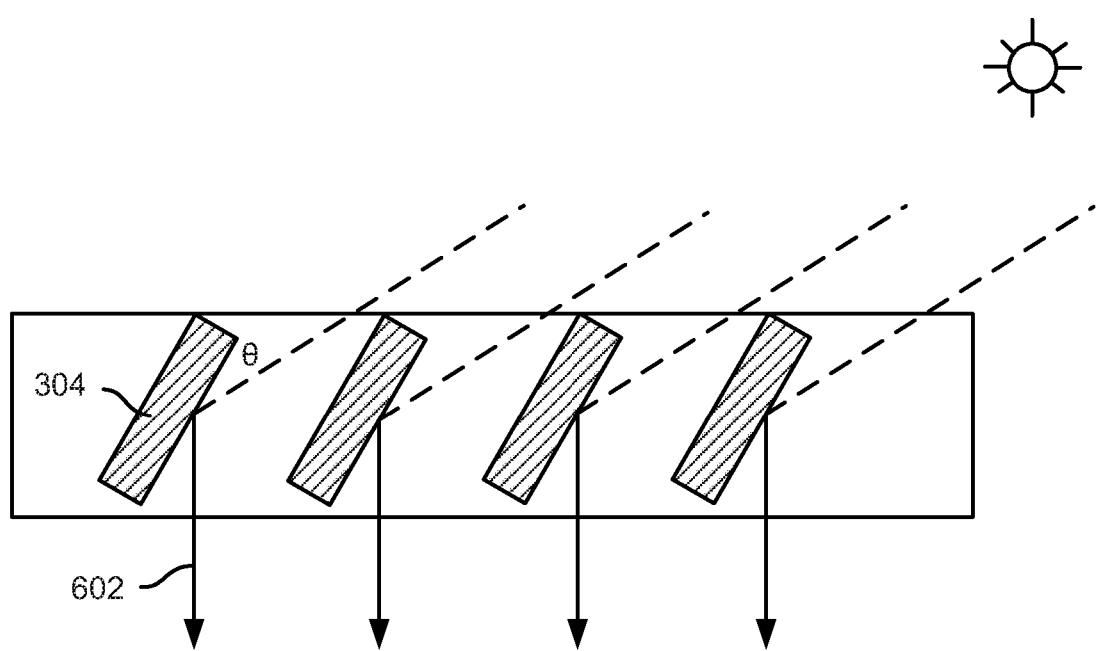
FIG. 6 is a block diagram illustrating an embodiment of a heliostat.

FIG. 6 is a block diagram illustrating an embodiment of a heliostat. In the example shown, the mirrors 304 of the heliostat 300 of FIG. 3 are viewed from the side. The mirrors 304 have been tilted to an angle such that the grazing angle θ of the sun's light hitting the reflective surface of the mirror is equal to the angle between the reflective surface and in this example the vertical (or any other desired direction to a desire target). The angle at which the mirrors 304 are tilted is varied through the day, as the sun appears to move higher and lower in the sky, so that the reflected beams 602 are directed more or less continuously onto the desired target.

In various embodiments, the shape of the reflective surfaces may be selected to achieve a desired illumination effect. For example, in some embodiments convex mirror surfaces are used to diffuse the reflected light. Conversely, concave mirrors could be used to concentrate the reflected light.

Figure 7:
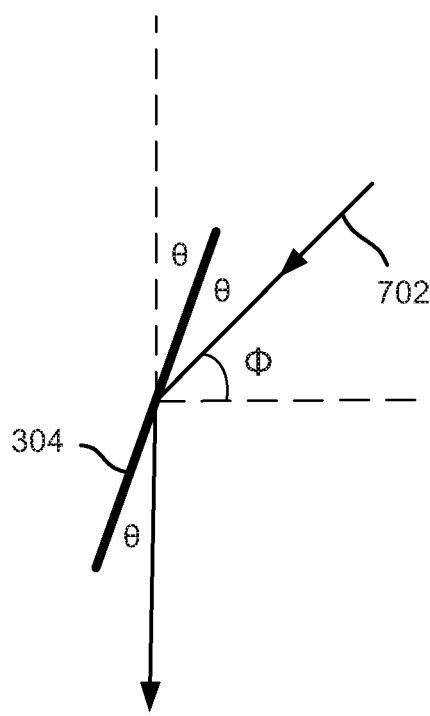
FIG. 7 is a block diagram illustrating the relationship between tilt angle and altitude of the sun in the special case in which light is desired to be reflected straight down.

FIG. 7 is a block diagram illustrating the relationship between tilt angle and altitude of the sun in the special case in which light is desired to be reflected straight down. In the example shown, the mirror 304 is tilted to an orientation such that the grazing angle θ of the sun's light hitting the reflective surface of the mirror 304 is such that the reflected light is directed straight down onto a target below. In this special case, since the angle the reflected beam makes with the reflective surface of the mirror is by a property of reflection the same angle θ, and since the angle between the reflected light and the reflective surface also is the same as the tilt angle by which the mirror 304 is rotated angularly from the vertical, in this special case the tilt angle selected to direct the reflected light straight down, plus the grazing angle (in this case the same as the tilt angle), plus the altitude φ of the sun at any time form a right angle. Therefore in some embodiments the tilt angle θ of the mirrors would be varied as required to maintain the relationship $2\theta+\phi=90°$, i.e., the tilt angle would be set to $\theta=(90°-\phi)/2$ and would be adjusted through the day as φ varied with the changing altitude of the sun as it appeared to move through the sky.

Figure 8:
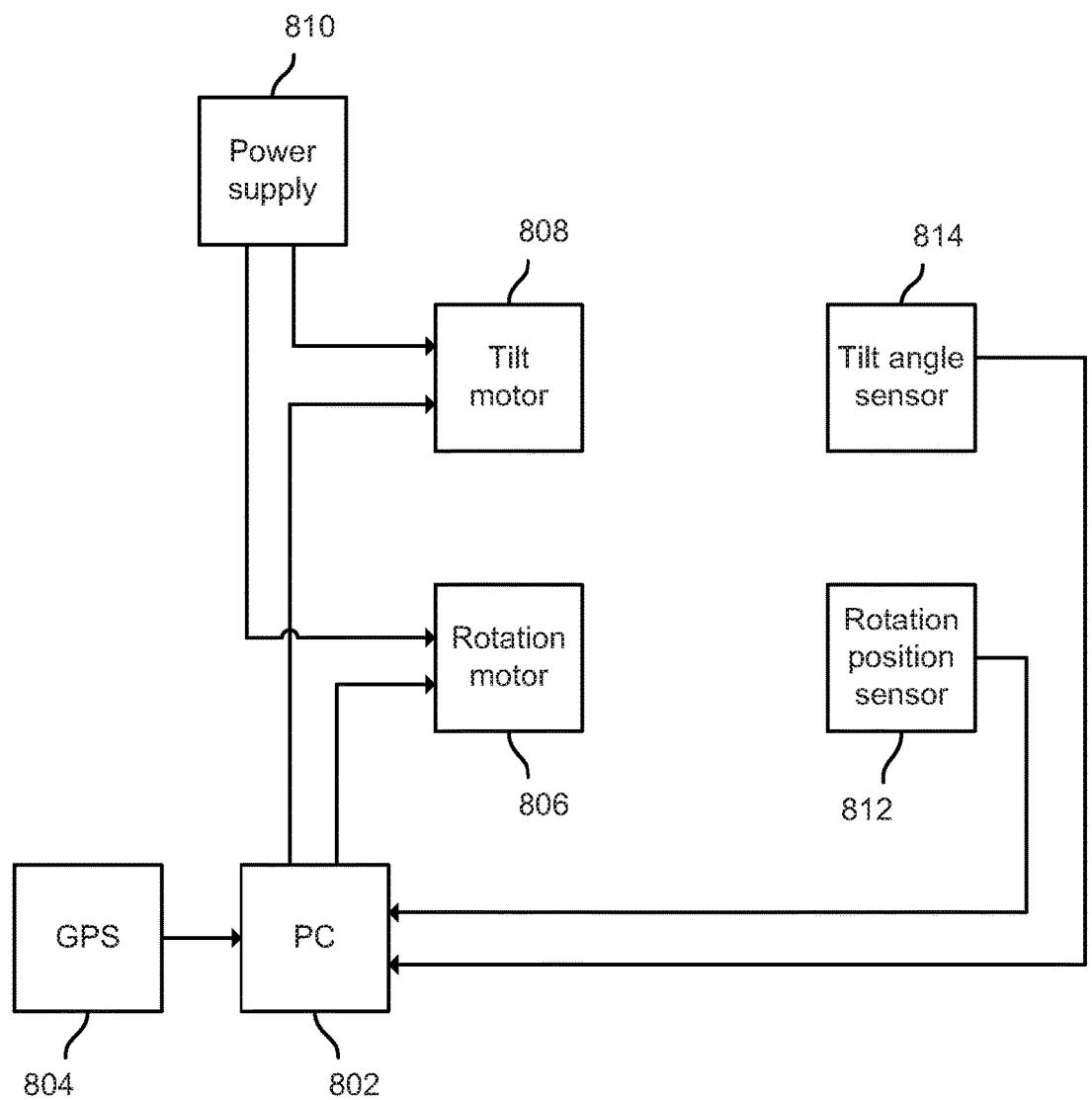
FIG. 8 is a block diagram illustrating an embodiment of a heliostat control system.

FIG. 8 is a block diagram illustrating an embodiment of a heliostat control system. In the example shown, a personal computer or other computer or processor 802 receives geographic position (e.g., latitude and longitude), time, and date information from a GPS or other device 804. In other embodiments, one or more of the location, time, and date information may be input manually and/or other than from a GPS device. The computer 802 is configured, e.g., by software or otherwise, to use the position, date, and time information, and astronomical theory, to compute predicted positions of the sun. In various embodiments, the computer 802 computes at a configured interval an azimuth to the sun (e.g., degrees relative to north or some other reference direction) and altitude or elevation of the sun. The computer 802 uses the computed position of the sun to determine an orientation of the reflective mirrors of a controlled heliostat, such as heliostat 300 of FIG. 3, required at any given time to direct reflected light to a configured target. The computer computes and sends to a rotation motor 806 and tilt motor 808 control signals to cause the motors 806 and 808 to rotate the mirror array and tilt the mirrors as required to achieve the desired orientation.

In some embodiments, computer 802 and/or GPS 804 may comprise a mobile computing device, such as a smart phone or tablet. An app may be installed on computer 802 to enable the heliostat to be programmed, directed to a target, and/or otherwise controlled. Wireless technologies such as Wi-Fi, Bluetooth, infrared, and/or other wireless communications may be used to communicate signals from the computer 802 to heliostat 300. For example, computer 802 and heliostat 300 may be on a same wireless network, such as a local network in a home or other building.

In some embodiments, a video camera or other video device is included and configured to provide video of the target area. The video is used in various embodiments for surveillance and/or control, for example to provide to computer 802 visual feedback indicating how well the heliostat is tracking the target area. For example, if light reflected by the heliostat gradually drifted off target, feedback from the video camera could be used to detect that condition and, for example, corrective control signals could be computed and/or the heliostat and associated control system reset.

A power supply 810 provides power to motors 806 and 808. In various embodiments, the power supply 810 comprises a super-capacitor, battery, or other energy storage device. In some embodiments the power supply is charged by one or more solar power devices, such as photovoltaic cells, mounted on the heliostat 300, for example on the surfaces opposite the reflective surfaces of mirrors 304. In some embodiments, photovoltaic cells mounted on the heliostat 300 power motors mounted on a same movable subassembly as the photovoltaic cells and the structures the motors position, eliminating the need for physical structures to transmit power, control signals, and/or motor force from external structures to the subassembly. In some embodiments, the photovoltaic cells may charge a battery or other storage device, to provide power for use at night or other times when the photovoltaic cell output may not be sufficient.

Referring further to FIG. 8 in the example shown, the computer 802 receives position feedback signals from rotation position sensor 812 and tilt angle 814. In some embodiments, control and/or feedback signals are sent wirelessly. For example, in some embodiments the heliostat comprises a WiFi or other wireless hub and the computer 802 is configured to log into the hub and provide control signals to and receive feedback signals from the heliostat via the wireless hub. In some embodiments, rotation position sensor 812 and tilt angle 814 comprise mechanical (e.g., detent based), optical, radiofrequency, or other position sensors. In various alternative embodiments, the control is open loop and rotation position sensor 812 and tilt angle 814 are omitted. In some embodiments, the heliostat may include accelerometers, magnetometers, or other sensors to determine automatically and provide to computer 802 an orientation, e.g., relative to the ground/floor, of the heliostat as installed. In various embodiments, incorporating one or more accelerometers, magnetometers, or other sensor enables the heliostat to determine its orientation automatically. In some embodiments, the heliostat is configured to use its orientation as determined using such integrated sensors to program itself to maintain and control the rotational position of the array and the position of the array elements relative to the sun as disclosed herein.

In some embodiments, a global positioning system (GPS) and/or orientation sensing functionality of a phone or other mobile device may be used to sense the location and/or orientation of the heliostat. For example, in some embodiments, a phone or other mobile app may be used to program the heliostat. The phone or other device may be placed flat against an angled ceiling or other structure along which the heliostat is or will be installed, and the phone or other device's features may be used to detect the angle and compass orientation of the heliostat. In some embodiments, the angle may not need to be detected and the app is used to steer the beam of light reflected out by the heliostat to a target, e.g., inside a house or other structure, enabling the heliostat to be programmed to maintain the beam on the target without first detecting or being provided with the angle at which the heliostat is installed.

In some embodiments, to conserve energy the computer 802 is configured to shut down when the heliostat is not in operation, e.g., at night, and to wake up in the morning. In some embodiments, the computer 802 is configured to reposition the heliostat only periodically and to shut down in between. The computer 802 in some embodiments comprises a microcontroller, mounted in some embodiments on a support structure of the heliostat.

Figure 9:
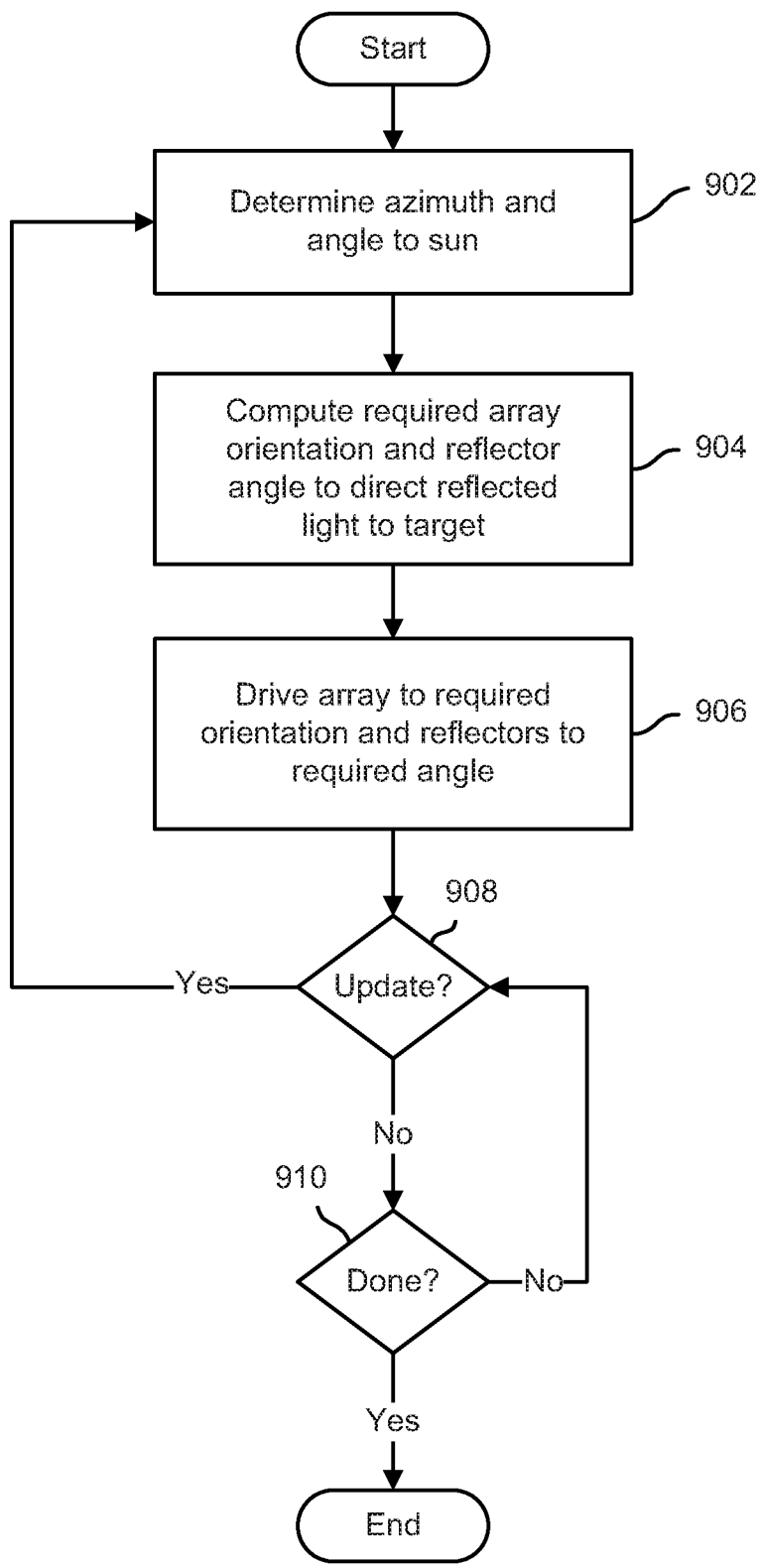
FIG. 9 is a flow diagram illustrating an embodiment of a process for controlling a heliostat.

FIG. 9 is a flow diagram illustrating an embodiment of a process for controlling a heliostat. In some embodiments, the process of FIG. 9 is implemented on a computer or other processor configured to control a heliostat, such as computer 802 of FIG. 8. In the example shown, the azimuth (direction) and altitude (elevation) of the sun are determined (902). The mirror array orientation required to direct reflected light of the sun to a target, given the sun's current position, is computed (904). The mirror array is driven to the required array orientation (e.g., rotation about annular axis of heliostat housing) and the mirrors are driven to the required tilt angle (906). The array remains in the position to which it has been driven until it is time to update (908), at which time a further iteration of 902, 904, and 906 is performed. The process continues until done (910), e.g., control of the heliostat is turned off until next needed.

In some embodiments, the heliostat is mounted such that a plane of the heliostat is substantially parallel to a skylight or other window or aperture. In the case of a pitched or other non-horizontal roof, the heliostat may not be oriented in a horizontal plane. In some such embodiments, a computer such as computer 802 of FIG. 8 is pre-programmed with a pitch angle and direction of the heliostat, and the pitch angle and direction are factored into the computation of the positions to which the heliostat must be driven to maximize the amount of light that is scooped and redirected to the target area. In some embodiments, the pitch angle may be detected by the heliostat itself, e.g., using accelerometers or other sensors, and provided to computer 802.

Figure 10:
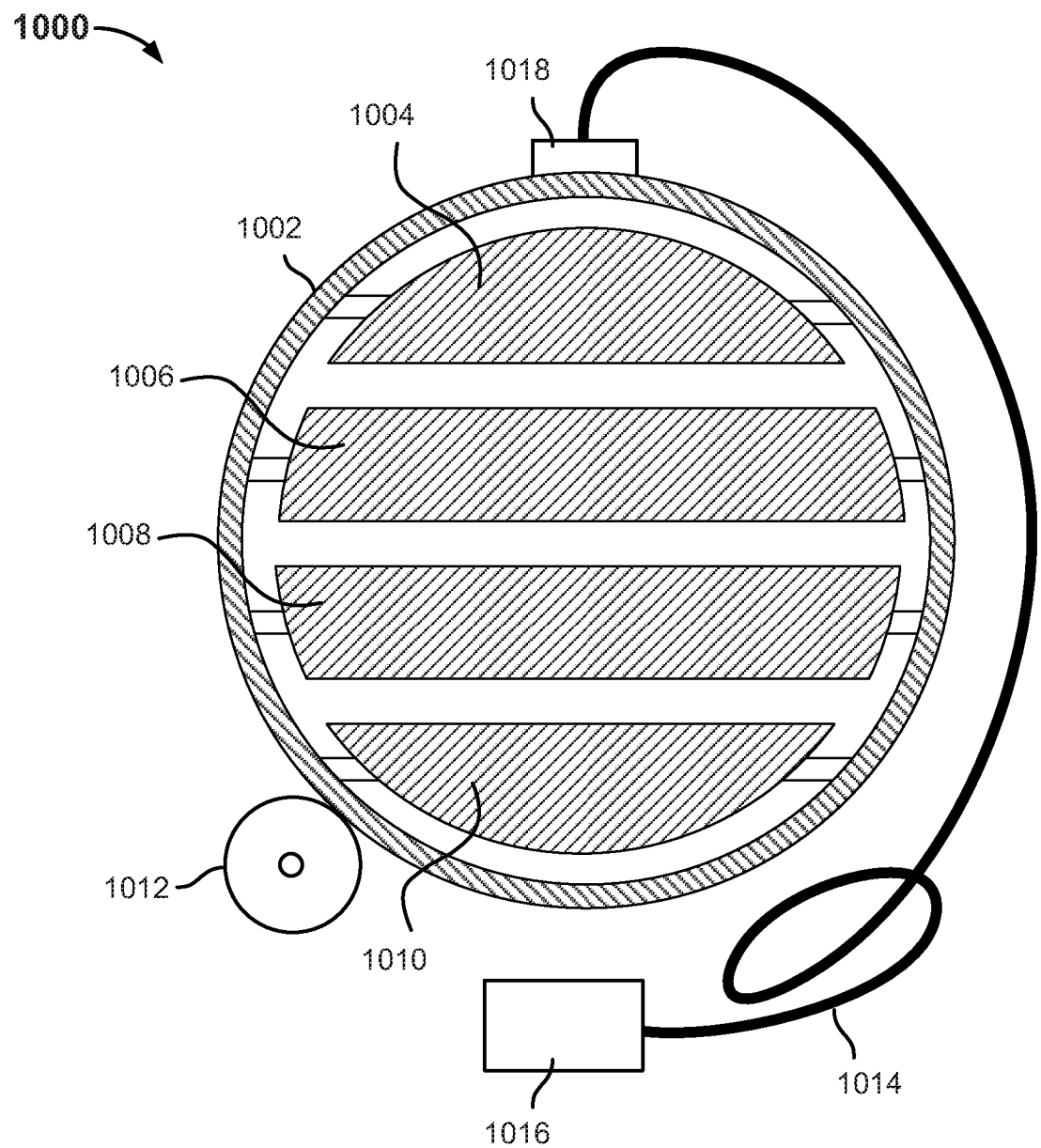
FIG. 10 is a block diagram illustrating an embodiment of a heliostat.

FIG. 10 is a block diagram illustrating an embodiment of a heliostat. In the example shown, heliostat 1000 includes an annular housing 1002 and an array of mirrors 1004, 1006, 1008, and 1010 mounted in housing 1002 in a manner that allows them to be rotated about their respective longitudinal axes. The respective shapes of the mirrors 1004, 1006, 1008, and 1010 in this example have been selected to maximize the reflective surface area within the confines of the annular housing 1002. Specifically, mirrors 1004 and 1010 have shapes suggestive of the capital letter "D", and mirrors 1006 and 1008 have rounded ends that follow the curve of annular housing 1002. A roller 1012 is configured to rotate housing 1002 and the mirrors 1004, 1006, 1008, and 1010 mounted therein about a central annular access of housing 1002. A cable drive 1014 driven by a motor 1016 and connected to a worm gear or other transmission mechanism 1018 are configured to adjust the tilt angle of the mirrors 1004, 1006, 1008, and 1010. In some embodiments, cable drive 1014 and gear 1018 drive a chain or belt that runs down a central axis of the mirror array.

While in the example shown in FIG. 10 a cable drive 1014 and transmission mechanism 1018 driven by an externally mounted motor 1016 are used to adjust the tilt angle of the mirrors, in some embodiments components mounted on and/or within annular housing 1002 are used to control the tilt angle. For example, photovoltaic cells mounted on annular housing 1002 and/or on the mirrors or other structures may be used to power one or more motors mounted on and/or within annular housing 1002 to control the tilt of mirrors 1004, 1006, 1008, and 1010.

Figure 11:
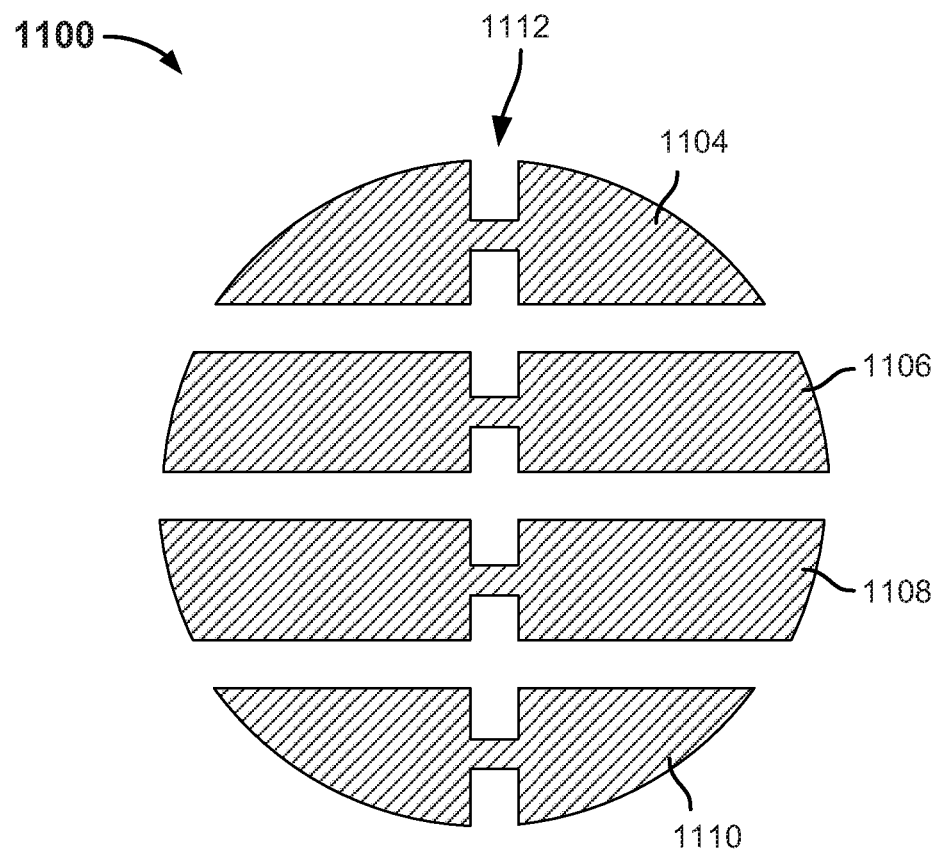
FIG. 11 is a block diagram illustrating an embodiment of a set of mirrors.

FIG. 11 is a block diagram illustrating an embodiment of a set of mirrors. In the example shown, mirrors 1100 include mirrors 1104, 1106, 1108, and 1110. Each mirror has a cutout in a central region indicated by arrow 1112 configured to facilitate rotation of the mirrors about their respective longitudinal axes, for example by a chain, belt, or other mechanism.

Figure 12A:
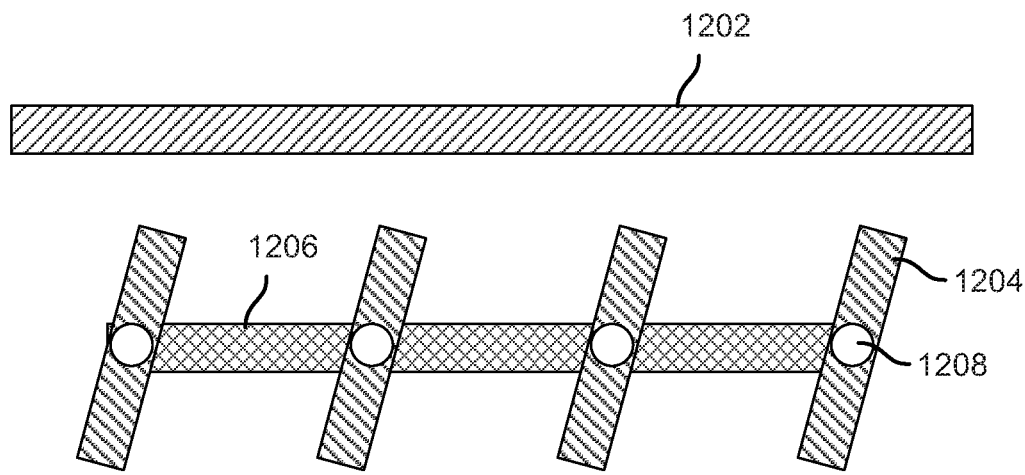
FIGS. 12A and 12B are block diagrams each illustrating an embodiment of a set of mirrors.
Figure 12B:
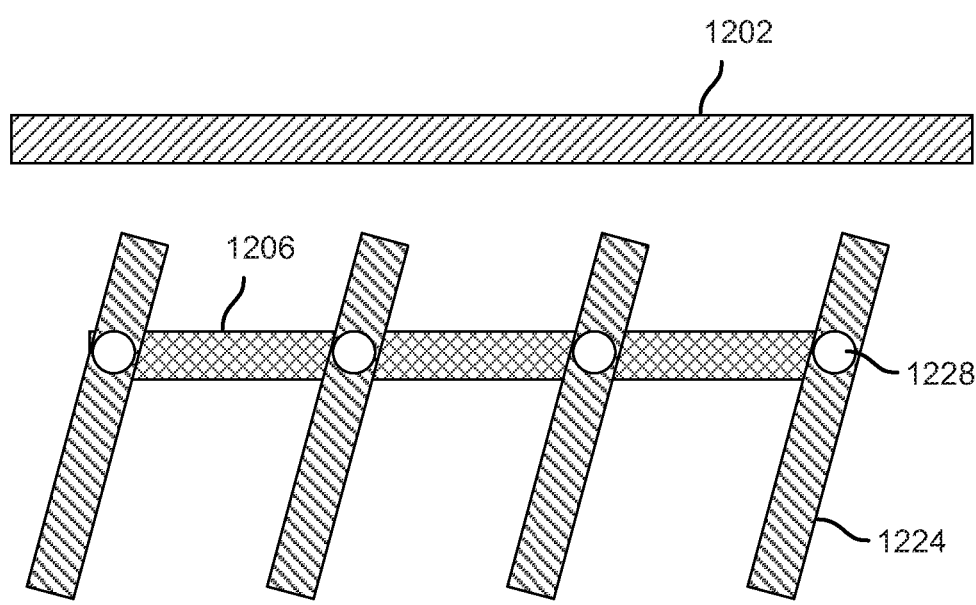

FIGS. 12A and 12B are block diagrams each illustrating an embodiment of a set of mirrors. In the example shown in FIG. 12A, mirrors 1204 are mounted on a bracket 1206 at a central longitudinal axis 1208. The mirrors 1204 are narrow relative to their length, allowing the mirrors 1204 to be positioned relatively near skylight 1202, since even in the fully vertical position the mirrors 1204 do not extend very far above the bracket 1206.

In the example shown in FIG. 12B, wider mirrors 1224 mounted at a longitudinal axis 1228 offset from the center are used. The mirrors in many geographic locations will not be required to be rotated through a full range of motion, allowing mirrors that extend further in the downward direction, and therefore having more reflective surface, area to be used. In various embodiments, the mirrors 1224 are not necessarily of the same width. For example, mirrors expected to remain at the back of the array, further away from the sun than mirrors kept at the front, may be wider, since with respect to those mirrors there is less concern that they will block light from reaching other mirrors behind them. In some embodiments, the mirrors may not be mounted on longitudinal axes having the same offset from center.

In some embodiments, the mirrors are mounted on brackets rotatably mounted to the heliostat housing. The mirrors may be shifted in the brackets to a position such that the mirrors rotate about an axis other than a central longitudinal axis of the mirror. In some embodiments, the mirrors are shifted to a position that allows the heliostat to be positioned nearer the skylight or other aperture.

While in a number of embodiments described and illustrated herein an array of four mirrors is described and/or shown, in other embodiments more or fewer mirrors may be included in the mirror array. Also, while rectangular and substantially rectangular mirrors are shown in some embodiments, in other embodiments arrays comprising mirrors of other shapes, such as squares, circles, or other shapes, and two dimensional arrays having more than one mirror per row, may be used. In addition, although a ring or other circular housing is shown in a number of embodiments described herein, in other embodiments a rotatable housing having another shape may be used, or the array may be held in position by a structure other than a rotatable housing.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A heliostat, comprising:
a housing;
a plurality of reflective elements arranged in a substantially planar array, each element mounted in the housing so as to be rotatable about a first axis of rotation of the element, the respective first axes of rotation being substantially in parallel and lying substantially in a plane or substantially parallel to a plane of the array, and each reflective element being of a shape and size such that a distance from the first axis of rotation to an outer edge of the reflective element is less than a distance at which the heliostat is configured to be placed on a light egress side of a fixed light-admitting aperture oriented at an arbitrary pitch and direction;
a plurality of shafts coupled to the plurality of reflective elements, the plurality of shafts substantially parallel to the plurality of reflective elements, each shaft coupled to a corresponding reflective element;
a first motor configured to rotate the array about an axis substantially perpendicular to the plane of the array;
a second motor coupled to the plurality of shafts and configured to rotate each of the plurality of shafts and each of one or more of said reflective elements about its respective first axis of rotation; and
a processor configured to:
provide control signals, determined by processor based at least in part on the pitch and direction of the light-admitting aperture, to operate the first and the second motor as required to orient the array and the reflective elements such that light from a light source is reflected from a first side of the array through the housing and directly from the array to a target located on a second side of the array that is opposite to the light source, the target being remote from the array and external to the housing;
receive one or more feedback signals, wherein at least one of the one or more feedback signals is a video camera signal, wherein the video camera feedback signal indicates an illumination condition of the target located on the second side of the array that is opposite to the light source.

2. The heliostat of claim 1, wherein the plurality of reflective elements comprises substantially rectangular elements arranged in a single column.

3. The heliostat of claim 2, wherein each of the reflective elements is rotatably mounted at one or both of its shorter sides and the first axis of rotation comprises a longitudinal axis of rotation.

4. The heliostat of claim 3, wherein each of the reflective elements is mounted to a side bracket.

5. The heliostat of claim 4, wherein the side bracket is configured to house a drive mechanism configured to transmit the respective reflective elements a motive force provide by the second motor in a manner that causes the reflective elements to be rotate about their respective axes of rotation.

6. The heliostat of claim 1, wherein the array of reflective elements is mounted in an annular housing.

7. The heliostat of claim 6, wherein the first motor is configured to a first rotate the array about an axis substantially perpendicular to the plane of the array by rotating the annular housing about an annular axis of the housing.

8. The heliostat of claim 1, wherein the processor comprises a personal computer (PC) or other computer.

9. The heliostat of claim 8, wherein the processor is configured to provide said control signals by installing and running on the computer software comprising computer instructions which when executed by the processor cause the processor to determine a position of the sun and to compute and transmit said control signals.

10. The heliostat of claim 1, wherein the processor comprises a mobile device.

11. The heliostat of claim 1, wherein said processor is responsive to wireless communications received from a mobile device.

12. The heliostat of claim 1, further comprising a global positioning system (GPS) device configured to provide one or more of latitude, longitude, date, and time of day information to the processor.

13. The heliostat of claim 1, further comprising a first position sensing device configured to detect a rotational position of the array about the perpendicular axis.

14. The heliostat of claim 13, wherein the processor is configured to receive a first feedback signal from the first position sensing device and use the first feedback signal to generate said control signals to operate the first motor as required to orient the array such that the respective axes of rotation of the reflective elements are substantially perpendicular to an azimuth to the sun.

15. The heliostat of claim 13, further comprising a second position sensing device configured to detect a rotational position of a reflective element about its first axis of rotation.

16. The heliostat of claim 15, wherein the processor is configured to receive a second feedback signal from the second position sensing device and use the second feedback signal to generate said control signals to operate the second motor as required to rotate the reflective element about its first axis of rotation to position the reflective element such that a vector orthogonal to a reflective surface of the reflective element substantially bisects an angle between a first vector from the reflective surface to the sun and a second vector from the reflective surface to a target to which light of the sun is to be reflected.

17. The heliostat of claim 1, further comprising an accelerometer, magnetometer, or other sensor configured to detect and provide to said processor a pitch angle of the heliostat.

18. The heliostat of claim 1, wherein said processor is configured to receive from an device external to the heliostat an input value to be used to determine said control signals.

19. The heliostat of claim 18, wherein said input value comprises a pitch angle and said device determines said pitch angle using an accelerometer or other sensor of said device.

20. The heliostat of claim 18, wherein said device includes an app or other functionality to steer the heliostat manually and said input value is determined by a user manually steering to a target a beam emitted by the heliostat.

21. The heliostat of claim 1, further comprising a housing in which the array is mounted and a frame to which the housing is rotatably mounted; and wherein said second motor is mounted on or within said housing.

22. The heliostat of claim 21, further comprising one or more photovoltaic cells mounted on or within the housing and configured to provide power to said second motor.

23. The heliostat of claim 1, wherein the one or more feedback signals includes at least one of a light detecting device or a surveillance device.

* * * * *